Jan. 2, 1968 R. PYZEL 3,361,539
FLUIDIZED SOLIDS REACTOR
Filed July 15, 1965 2 Sheets-Sheet 1

INVENTOR
Robert Pyzel
BY
ATTORNEYS

Jan. 2, 1968 R. PYZEL 3,361,539

FLUIDIZED SOLIDS REACTOR

Filed July 15, 1965 2 Sheets-Sheet 2

INVENTOR
Robert Pyzel
Pennie Edmonds Morton Taylor Adams
ATTORNEYS

United States Patent Office 3,361,539
Patented Jan. 2, 1968

3,361,539
FLUIDIZED SOLIDS REACTOR
Robert Pyzel, 85 East End Ave.,
New York, N.Y. 10028
Filed July 15, 1965, Ser. No. 472,082
6 Claims. (Cl. 23—284)

ABSTRACT OF THE DISCLOSURE

A fluidized solids reactor for high temperature operations requiring burning within the fluidized bed. The reactor has a large diameter bed supporting grid carrying a plurality of fuel pipes extending upwardly through the grid for uniformly distributing fuel throughout the fluidized bed to insure complete combustion of the fuel within the bed.

---

This invention relates to apparatus for carrying out reactions in a mass of fluidized particles. More particularly, the invention is concerned with a novel reactor, which is suitable for reactions, such as those requiring high heat generation within the fluidized mass, reactions, in which the substances taking part exhibit a temporary stickiness causing agglomeration of the particles, and reactions requiring temperatures so high as to preclude the use of metal parts in contact with the fluidized mass. Although not so limited in utility, the new reactor is especially adapted for use in large diameters for carrying out reactions in a fluidized mass of such depth in relation to the reactor diameter that a high aeration rate is required and horizontal turbulence in the mass may not be relied on to effect the necessary intermingling of fuel and air within the mass. Novel features of the reactor make it possible to consume the stoichiometric quantity of fuel based on the aeration oxygen rate within the mass and without substantial burning of fuel above the mass. As a result, maximum heat liberation within the mass is obtained together with high reactor output and fuel efficiency.

The new reactor may be employed in carrying out reactions of various kinds, of which the clinkering of Portland cement raw materials and the defluorination of phosphate ores are typical. As all the advantages of the invention are realized in a form of the reactor for producing cement clinker, such a reactor will be illustrated and described for purposes of explanation.

In the accompanying drawings.

Figure 1:
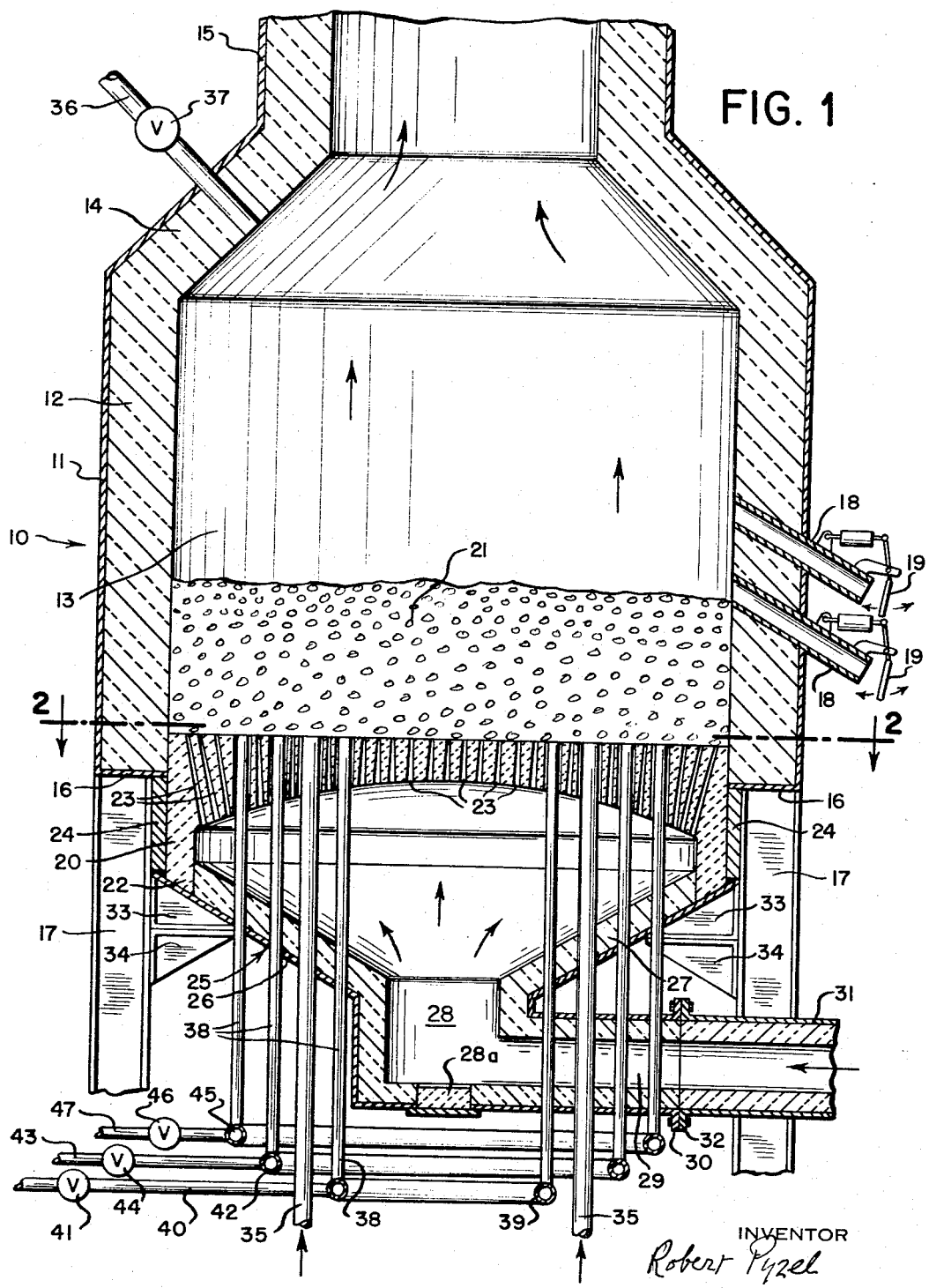
FIG. 1 is a view in vertical section of a reactor constructed in accordance with the invention.
Figure 2:
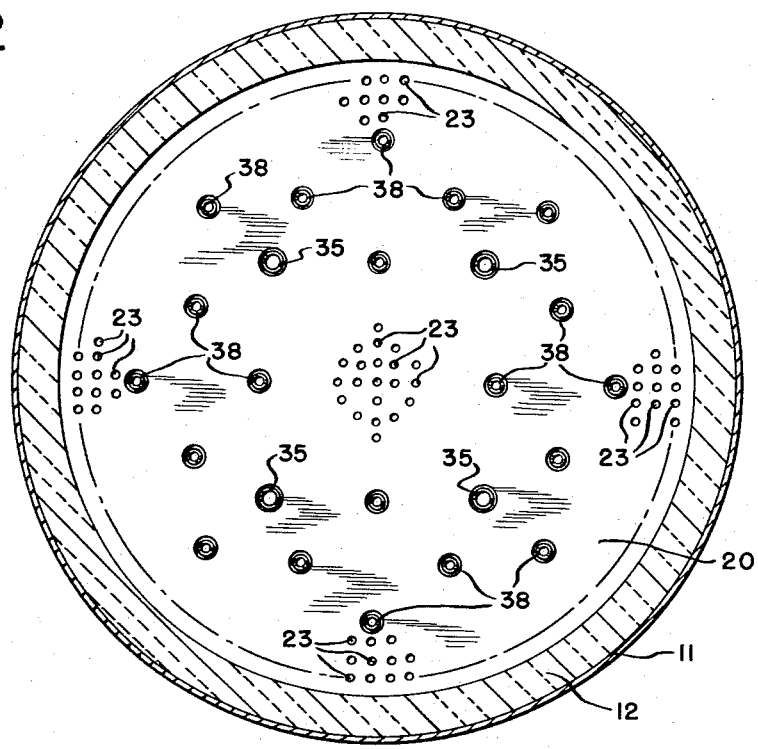
FIG. 2 is a sectional view on the line 2—2 of FIG. 1.
Figure 3:
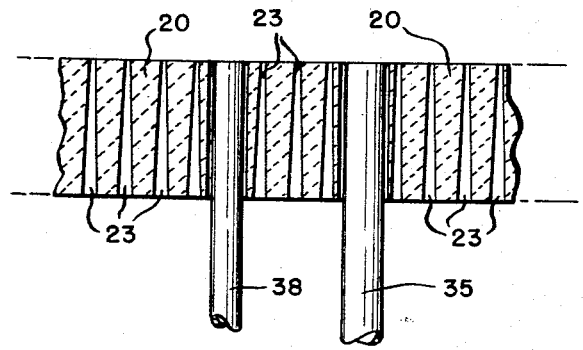
FIG. 3 is a fragmentary vertical sectional view of the grid.

The new reactor as shown in the drawings comprises a vessel 10 having a metallic shell 11 with a refractory lining 12. The main part 13 of the vessel is preferably cylindrical and disposed with its axis vertical and it has an upper conical section 14 leading to a top outlet 15 for exhaust gases. At its lower end, the shell has an internal flange 16 which rests upon a plurality of beams 17 supporting the reactor at the desired elevation. The vessel is provided with one or more product discharge outlets 18 in the form of tubes mounted in openings in the shell and in passages through the lining leading inward from the openings. When the vessel has more than one such outlet, the outlets are placed at different levels and they may be displaced angularly about the axis of the vessel. The outlets are provided with flapper valves 19, so that the discharge of the product may be continuous or intermittent. If necessary, the outlets may be water-cooled to protect them against excessive heat.

The lower end of the vessel is closed by a grid 20, which supports the bed 21 of fluidized material and is made of a ceramic material of the type known as a high temperature castable. The grid is of arch form in cross-section with a downward peripheral flange 22 and it is formed with a multiplicity of closely spaced air passages 23 which decrease in diameter upward and preferably have a taper of ¼ in. to ½ in. per foot of length with a top opening from ⅜ in. to ¾ in. in diameter. A metal ring 24 tightly encircles the grid to reinforce it.

An air chamber 25 is mounted below the grid and it comprises a metallic shell 26 with an insulating lining 27. The chamber is of inverted conical shape and it has an inlet 28 at its lower end with a manhole 28a and a lateral extension 29 having an end flange 30, by which the extension can be connected to an air supply pipe 31 having a corresponding flange 32. The air chamber is provided with a plurality of brackets 33 which rest upon similar brackets 34 attached to the columns 17 and support the chamber. The shell 26 of the air chamber extends beneath the flange 22 on the grid, so that the grid is supported by the columns.

Raw material is introduced into the bed on the grid through a plurality of feed pipes 35 which extend through the shell of the air chamber and through the chamber into openings through the grid. The number of feed pipes employed depends on the diameter of the reactor and, with a reactor of small diameter, a single feed pipe disposed at the center of the grid may be used. The reactor shown is provided with four feed pipes, which is a suitable number for a reactor of medium diameter, such as 18 to 20 feet, and the pipes are equi-angularly spaced with one in each quadrant of the grid area. In all instances, the feed pipes are disposed in the central area of the grid and lie a substantial distance, at least four feet, from the reactor wall. The fluidized mass is established on the grid at the start of the operation of the reactor by charging the fluidized mass particles through the inlet pipe 36 extending through the wall of the conical section 14 of the reactor and provided with a control valve 37.

The fuel is introduced into the bed through a plurality of pipes 38 which extend through the shell of the air chamber and through the chamber into openings through the grid. In order that all parts of the bed may be properly supplied with fuel, a relatively large number of fuel pipes are provided, the number depending on the diameter of the reactor, the depth of the fluidized bed, and the kind of fuel used. Thus, a reactor fired with gas as fuel should have one fuel pipe for each 8 to 20 sq. ft. of reactor cross-sectional area, when the bed is six feet deep, while a reactor having a bed of the same depth and fired with oil requires a lesser number of fuel pipes and one pipe for each 15 to 30 sq. ft. of reactor cross-section is ordinarily adequate. When pulverized solid fuels, such as coal or coke, are used the number of fuel injection points may be further reduced, probably because the solid fuel particles become part of the fluidized mass and churn about therein while burning. When the feed material and the fuel are both finely divided solids, it may be convenient to combine the fuel and feed materials and inject the mixture at a number of points, such as eight points in a reactor of 20 ft. diameter. Such an arrangement requires more injection points for the mixture than would be required for injection of the feed alone, but it eliminates all or nearly all separate fuel pipes and the equipment for injecting the feed may serve to inject the pulverized fuel.

The reactor illustrated is provided with twelve fuel pipes 38 and the pipes are arranged in three concentric groups with the members of the inner group connected by a circular header 39 supplied through a pipe 40 provided with a control valve 41. The pipes in the middle group are connected by a header 42 supplied through a pipe 43 provided with a control valve 44 and those in the outer group are connected by a header 45 supplied by a pipe 47 with a control valve 46.

In the operation of the reactor, preheated air is supplied to the air chamber 25 through the pipe 31 and the particles, which are to form the fluidized mass are charged through the pipe 36. The air, which may ultimately be preheated by heat derived by heat exchange from the exhaust gases leaving the reactor, fluidizes the bed formed on the grid and, when the mass reaches fuel ignition temperature, fuel is charged into the mass through the fuel pipes 38 and the fuel supply is gradually increased as the mass becomes incandescent. When the desired reaction temperature has been reached, feed material is charged into the mass through the feed pipes 35. The depth of the bed depends on the amount of material originally charged, the rate of feed, and the height above the grid of the product discharge outlets which are open.

In reactors of medium and large diameter, for example, 15 to 50 ft., the depth of the fluidized mass may be no more than 4 to 10 ft. and when the reactions being carried on involve a coarse particle size distribution, as in the clinkering of Portland cement raw materials, the defluorination of phosphates, etc., the operation requires a high aeration rate to maintain the proper fluidity of the mass of particles. In such circumstances, the aerating gas, which is ordinarily air or air enriched with oxygen and enters the mass at the bottom through the grid, passes upward through the mass in less than two or three seconds and frequently in only a fraction of a second. When fuel is injected into such a fluidized mass through the wall of the reactor as has been common practice heretofore, it is not possible for the fuel and air to combine in the central part of the mass. If fuel is supplied at the stoichiometric rate, burning with insufficient air occurs in the peripheral section of the mass and partially burned fuel combines above the mass with air issuing from the center of the mass, so that flames and excessive temperatures occur above the mass and the heat generation within the mass is reduced. To avoid the conditions described, it is necessary to reduce the rate of fuel supply and this results in operation with excess air, causing lower fuel efficiency and reduced reactor capacity. The same undesirable conditions develop when fuel is injected into the fluidized mass at points too far apart, so that large sections of the mass are without fuel supply. The conditions mentioned always occur in large reactors, in which the fuel is injected into the mass through the reactor walls and may occur with other fuel injection arrangements not specially designed to meet the requirements indicated.

In the reactor of the invention, the fuel is injected into the fluidized mass at the bottom and at relatively closely spaced points, so that the fuel and air are caused by the horizontal turbulence within the mass to intermingle throughout the mass. As a result, substantially complete combustion occurs within the mass, even when the fuel rate is close to the stoichiometric rate based on the oxygen content of the air supplied to the mass, and no burning of consequence occurs in the reactor above the mass.

In the operation of fluid bed reactors, it has been found that the material in the bed close to and in contact with the reactor wall is hardly fluidized but, instead, is bulk material, which gradually descends along the wall, until it reaches the bottom of the wall, whereupon the material moves inward over the grid and is churned into the fluidized mass. When the reaction is one in which even a slight degree of stickiness develops in the feed material between the time of its introduction and the formation of the final product, the bulk material descending along the wall of reactors as heretofore constructed is a source of operational difficulties. Such stickiness developing during the course of the reaction but not present in either the feed material or the final product is a typical feature of a number of reactions, such as converting cement raw materials into clinker, the defluorination of phosphate rock while preserving maximum water solubility of the phosphates, etc. When the intermediate sticky stage occurs in the bulk material along the reactor walls, the material may become stuck together and to the reactor wall with the result that the material is immobilized. The fluidized part of the bed may then gradually retreat toward the center until satisfactory operation can no longer be maintained.

The problem presented by the development of stickiness in the fluidized mass is overcome in the reactor of the invention by charging the feed materials through the grid at one or several points disposed in a central area of the grid and at a substantial distance of at least four feet from the reactor wall. When the material is thus introduced, it is at once carried upward in the general central upward current of particles from the grid through the mass and then, at the top of the mass, the feed particles move outward toward the wall and then down to the grid, where an inward flow toward the center of the grid occurs. Although the material close to the wall becomes partly or wholly de-fluidized as a result of the tendency of the aerating gas to travel toward the axis of the bed and the immobilizing effect of the wall itself, in the reactor of the invention, the reacting materials introduced through a central area of the grid and a substantial distance from the wall must travel the maximum distance upward through the bed and outward to the wall before becoming part of the bulk material traveling down the wall. During such upward and outward travel of the materials, they pass through and beyond the sticky stage and agglomeration of the bulk material and adhesion to the wall are thus reduced or eliminated.

In the operation of a fluid bed reactor, it is important that the aerating gases pass uniformly through the grid and this result is achieved in the reactor of the invention by constructing the grid so that a pressure drop of the order of 25 percent or more of the static pressure head of the fluidized mass is required to force the gases through the grid. A pressure drop within the range of ½ lb. to 2½ lbs. per square inch of grid area will suffice for most applications with a range of ¾ lb. to 1½ lbs. per square inch of grid area being the preferred range by most fluid bed reactor apparatus. With such a pressure drop, the effect of momentary variations in the static pressure on any section of the grid resulting from the violent turbulence characteristic of fluidized solids reactions, particularly those involving high aeration flow rates and relatively coarse particle size distribution, is minimized.

The provision in the new reactor of air passages tapering in diameter upward serves a number of useful purposes. In the course of the reaction, agglomerations of particles are likely to be formed and, initially, the particles are loosely bound in such agglomerations, the strength of the bond increasing with time. The agglomerations tend to hover in the mass close to the grid and the high velocity jet action of the air streams entering the mass through the tapered passages in the grid breaks up the agglomerations and also forces them away from the grid and into the upward current through the mass, so that the agglomerated chunks can reach the product discharge outlet.

The taper of the aeration holes through the grid prevents clogging of the holes, such as occurs with conventional holes of uniform diameter, during temporary reduction in or total failure of the flow of aerating fluid as a result of a power failure or other mishap. Moreover, with holes increasing in diameter downward, the fluidized mass on the grid may be discharged through the grid when the reactor is to be shut down and drained from air chamber 25 through manhole 28a.

I claim:

1. Apparatus for carrying out reactions in a mass of fluidized particles which comprises a vessel having a gas outlet at the top and a refractory lining, an air chamber below the vessel, a grid of refractory material for supporting a fluidized mass of solid particles and separating the vessel from the chamber, the grid having a plurality of air passages through it connecting the chamber and the vessel, said air passages being uniformly distributed throughout the entire area of the grid at least one product discharge outlet through the side wall of the vessel, means for supplying air under pressure to the chamber for escape into the vessel through the air passages for fluidizing a mass of solid particles thereabove, the air being supplied at such pressure and the size and distribution of the air passages being so arranged that there is a pressure drop through the grid within the range of ½ lb. to 2½ lbs. per square inch of grid area means for introducing fuel directly into the fluidized mass through the grid at a plurality of points substantially less in number than the number of air passages, said plurality of points being uniformly distributed throughout the area of the grid for intimate contact and intermingling with the fluidized mass to insure complete combustion within the bed, and means for introducing raw material into the vessel.

2. The apparatus of claim 1, in which the air passages taper in diameter upwardly, said taper of the air passages being within the range of ¼″ to ½″ per foot of length and the top opening of the passages having a diameter within the range of ⅜″ to ¾″.

3. The apparatus of claim 2, in which the pressure drop is within the range of ¾ lb. to 1½ lbs. per sq. in. of grid area.

4. The apparatus of claim 3, in which the means for introducing fuel into the vessel introduces gaseous fuel at spaced points, at least one within each 8 to 20 sq. ft. of reactor cross-sectional area.

5. The apparatus of claim 1, in which the means for introducing fuel introduces liquid fuel at spaced points, at least one within each 15 to 30 sq. ft. of reactor cross-sectional area.

6. The apparatus of claim 1 wherein the raw material is introduced through a central part of the grid spaced a substantial distance from the side wall of the vessel.

References Cited

UNITED STATES PATENTS 2,774,661  12/1956  White _____ 263—21
3,022,988   2/1962  Corson et al. _____ 263—21
3,192,644   7/1965  Knibbs et al. _____ 23—288.35

FOREIGN PATENTS 753,904   8/1956  Great Britain.

JAMES H. TAYMAN, Jr., *Primary Examiner.*